United States Patent [19]

Ohki et al.

[11] Patent Number: 5,293,291
[45] Date of Patent: Mar. 8, 1994

[54] OPTICAL INTEGRATED DEVICE FOR MAGNETO-OPTICAL REPRODUCING HEAD

[75] Inventors: Hiroshi Ohki, Yokohama; Masaaki Doi, Kashiwa; Hideki Akasaka, Kamagaya, all of Japan

[73] Assignee: Nikon Corporation, Tokyo, Japan

[21] Appl. No.: 963,019

[22] Filed: Oct. 19, 1992

Related U.S. Application Data

[63] Continuation of Ser. No. 677,478, Mar. 29, 1991, abandoned.

[30] Foreign Application Priority Data

Apr. 9, 1990 [JP] Japan .................. 2-92045

[51] Int. Cl.⁵ .................. G11B 7/135; G11B 11/14
[52] U.S. Cl. .................. 360/114; 369/13; 369/44.12; 369/110; 369/112; 385/11; 385/14
[58] Field of Search .................. 360/114; 369/44.12, 369/110, 112, 13; 359/196; 385/1, 2, 14, 6, 11

[56] References Cited

U.S. PATENT DOCUMENTS

| | | | |
|---|---|---|---|
| 3,990,776 | 11/1976 | Tseng et al. | 385/6 |
| 4,220,395 | 9/1980 | Wang et al. | 385/6 |
| 4,861,128 | 8/1989 | Ishikawa et al. | 369/110 |
| 4,945,525 | 7/1990 | Yamamoto et al. | 369/44.12 |
| 4,991,160 | 2/1991 | Premji | 369/44.12 |

FOREIGN PATENT DOCUMENTS 0345232 6/1989 European Pat. Off.

*Primary Examiner*—Stuart S. Levy
*Assistant Examiner*—Paul J. Ditmyer
*Attorney, Agent, or Firm*—Shapiro and Shapiro

[57] ABSTRACT

A device comprises five wave guides and two interposed TE-TM mode splitters, formed on a substrate. A first mode splitter splits a first wave guide into second and third wave guides, and a second mode splitter splits a third wave guide into fourth and fifth wave guides. A light beam directed to the first wave guide through the second wave guide is radiated to a magneto-optical recording medium. A signal light beam carrying the information recorded on the medium, reflected by the medium, is directed to the third wave guide through the first mode splitter, and the polarization plane of the signal light beam is rotated by a polarization plane rotation device. The signal light beam is further split by the second mode splitter and directed to the fourth and fifth wave guides, thence to external detectors.

8 Claims, 2 Drawing Sheets

OPTICAL INTEGRATED DEVICE FOR MAGNETO-OPTICAL REPRODUCING HEAD

This is a continuation of application Ser. No. 677,478 filed Mar. 29, 1991, now abandoned.

BACKGROUND OF THE INVENTION

1. Field of the Invention

The present invention relates to an optical integrated device used in optically reproducing magnetically recorded information from a magneto-optical recording medium.

2. Related Background Art

In order to reduce size and a cost of a reproducing head for a magneto-optical recording medium (hereinafter referred to as a disk), an optical integrated device having a wave guide or other optical elements formed on a substrate may be used.

For example, in an optical integrated device shown in EP 345,232 (hereinafter referred to as prior art), a second wave guide for supplying an illumination light beam and a third wave guide for emitting a reflected light beam are arranged in branches at one end of a first wave guide which functions as a forward path of the illumination light beam to the disk and a return path of the reflected light beam. The reflected light beam is analyzed by a so-called differential method to read and reproduce magnetically recorded information of the disk.

The disk is primarily made of a perpendicularly magnetized film such as GdCo or GdTbFe, and the direction of magnetization of the perpendicularly magnetized film is initially oriented either upward or downward. In the area where information has been recorded, the direction of magnetization is reversed. The information to be recorded is represented by the number and/or length of marks having opposite direction of magnetization.

The recorded information is read by utilizing a phenomenon (magnetic Kerr effect) in which a rotation status of a polarization plane of reflected light when a linearly polarized light is illuminated to the disk changes with the direction of magnetization (upward or downward) of the magnetic film of the disk in the area at which the information has been recorded. For example, assuming that the polarization plane of the reflected light is rotated by $\theta_k$ degrees relative to the polarization plane of the incident light when the direction of magnetization is upward relative to the incident light, it is rotated by $-\theta_k$ degrees when the direction of magnetization is downward relative to the incident light.

In the prior art, the differential method is used to read and reproduce the recorded information or detect the rotation status of the polarization plane due to the Kerr effect.

In the differential method, the reflected light is split (by a TE-TM mode splitter arranged in a wave guide) into two polarized light components having mutually orthogonal polarization planes and substantially equal light intensities, and the split beams are directed to photo-electric converters (detectors) to detect an output difference (a difference between longitudinal components of oscillation) from the detectors. It is advantageous in terms of S/N ratio over a direct method in which a conventional analyzer is used as an optical bulk element to measure only one of the polarized light components.

When the differential method is used, it is necessary to set the direction of polarization of the reflected light to 45 degrees relative to the initial polarization plane of the incident light before it is subjected to the Kerr rotation. Thus, in the prior art, a polarization plane rotating element (mode converter) is arranged in the wave guide (single forward path of the light beam) which supplies the detection light.

In the optical integrated device of the prior art, two optical elements, the mode converter and the beam splitter, are required in addition to the wave guide, and those elements and the arrangement thereof significantly affect a reproducing capability.

Namely, in the prior art, the mode converter is provided in the area of the second wave guide (single forward path of the light beam) which supplies the detection light in order to deflect the initial TE mode light (which has a polarization plane parallel to the plane of substrate) by 45 degrees. More exactly, it is controlled to incline by 45 degrees when it is emitted from the first wave guide.

A problem here is radiation loss at a branch point of the first wave guide, and the second wave guide and the third wave guide. When the light passes therethrough, both the TE mode light and the TM mode light (which has a polarization plane normal to the substrate) are subject to 50% radiation loss. A loss of the incident light may be compensated by increasing a laser power but a loss of the reflected light means reduction of read efficiency of the signal component, which is a significant defect.

SUMMARY OF THE INVENTION

It is an object of the present invention to provide a novel optical integrated device which improves a read and reproduction sensitivity for information recorded on the disk by enhancing a read efficiency for a signal component by the reflected light.

In order to achieve the above object, the optical integrated device for the magneto-optical reproducing head of the present invention comprises a first wave guide for guiding a light beam for irradiating a magneto-optical recording medium and a signal light beam reflected by the medium; a first TE-TM mode splitter for splitting said first wave guide into two wave guides; a second wave guide coupled to said first wave guide through said first splitter for guiding the light beam for irradiating the magneto-optical recording medium to said first wave guide; a third wave guide coupled to said first wave guide through said first splitter for guiding said signal light beam from said first wave guide; polarization plane rotation means arranged in a course of said third wave guide for rotating a polarization plane of said signal light beam; a second TE-TM mode splitter for splitting said third wave guide into two wave guides; a fourth wave guide and a fifth wave guide coupled to said third wave guide through said second splitter for guiding the detection light beams split by said second splitter; and a substrate having said five wave guides and said two mode splitters formed thereon.

In the optical integrated device of the present invention, the light beam guided from the light supply source through the second wave guide is guided to the first wave guide through the first mode splitter and is radiated to the disk plane from the end plane of the first wave guide. The signal light beam reflected by the disk plane again enters the end plane of the first wave guide and is guided to the third wave guide, through the first mode splitter.

The branching of the guided light in the first wave guide is conducted by the first mode splitter arranged in an area of the first wave guide containing a branch point. The first mode splitter may be designed by a design condition of the first wave guide.

As an example, the first wave guide may be a double mode wave guide having a length thereof determined by a wavelength of the light beam used, and the first mode splitter may be designed such that the light beam of the TE mode directed from the light source to the second wave guide passes through the first mode splitter and approximately 80% of the intensity thereof is transmitted to the first wave guide, and the signal light beam reflected with $\partial$ degrees rotation by the Kerr rotation by the reflection on the disk plane passes through the first mode splitter and approximately 20% of the intensity of the TE mode light and 100% of the intensity of the TM mode light are transmitted from the first wave guide to the third wave guide. Since it is considered that the signal component by the Kerr rotation angle is included in the TM mode, the radiation loss of the signal component of the reflected light can be avoided by adopting the mode splitter described above.

The signal light beam directed to the third wave guide by the first mode splitter has the polarization plane thereof rotated by 45 degrees by the polarization plane rotation means provided in the third wave guide, and it is further split by the second mode splitter and directed to the fourth wave guide and the fifth wave guide.

The second mode splitter is arranged in an area which includes a branch point of the third wave guide, and the fourth and fifth wave guides, and it is designed to split the signal light beam which has the polarization plane thereof rotated in the third wave guide into the TE component and the TM component which are to be directed to the fourth wave guide and the fifth wave guide, respectively.

The recorded information is read and reproduced from the signal light beams directed to the fourth wave guide and the fifth wave guide by the differential method as is done in the prior art.

In order to read the information from the magneto-optical recording medium, a light source for supplying the light beam to be used for reading and a detector for reproducing the information from the signal light beam reflected by the disk plane are required. In the optical integrated device of the present invention, those are separate parts although they may be integrated into a hybrid optical IC.

The optical integrated device of the present invention is explained in further detail with reference to the embodiments.

DETAILED DESCRIPTION OF THE PREFERRED EMBODIMENTS

Figure 1:
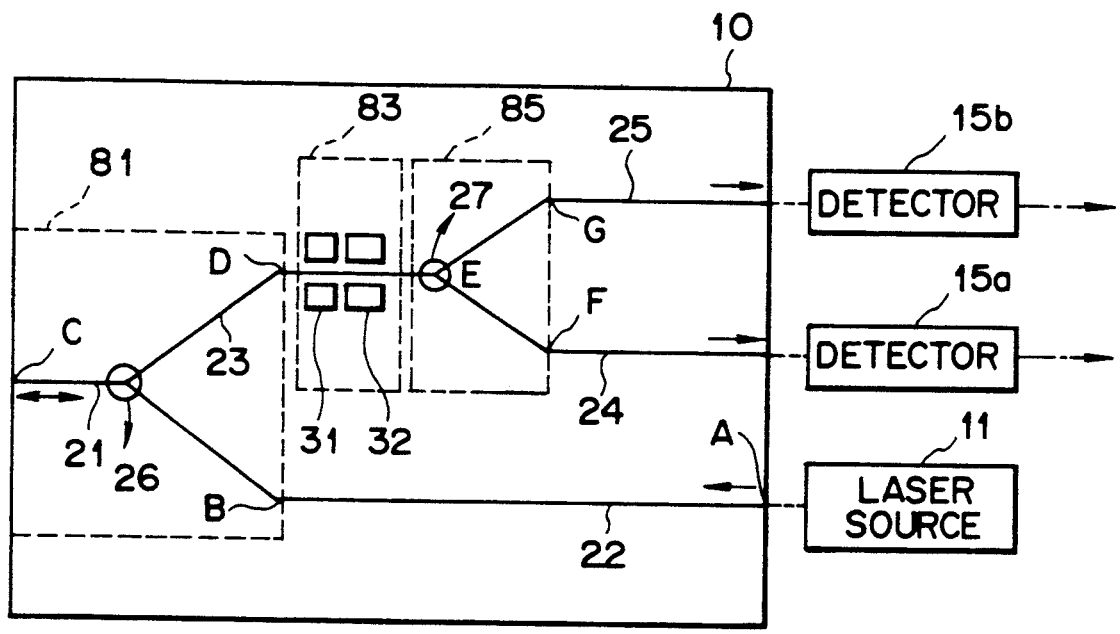
FIG. 1 shows a schematic view of a first embodiment of the present invention.

FIG. 1 shows a schematic view of an optical integrated device in accordance with one embodiment of the present invention.

In the optical integrated device shown in FIG. 1, wave guides are formed in an area shown by solid lines on a substrate 10. A method for forming the wave guides is well known in the optical integrated device. In the present embodiment, a Ti coating is formed at an area on the substrate 10 node of $LiNbO_3$ on which the wave guides are to be formed, and it is heated to 1000° C. or higher to trans-diffuse it, although the material and the process are not restrictive.

A laser source 11 coupled to an end plane of a wave guide 22 of the substrate 10 supplies a laser beam to be used to read information from a disk. The light beam in the wave guide 22 has an electric field vector thereof polarized parallel to the substrate 10 (TE polarization).

The laser beam from the laser source 11 is directed to a wave guide 21 from the wave guide 22 while the polarization status described above is maintained. Most portions of the light beam directed through the wave guide 22 are directed from a first branch point B to a point C on an end plane of the wave guide 21, and the light beam emitted from the point C out of the substrate 10 is directed to the disk, reflected by the disk plane and again returned to the point C as a signal light beam. The polarization plane of the reflected signal light beam is rotated from that of the initial light beam (TE polarization) by the Kerr effect due to the property of the magneto-optical material of the disk so that a TM component (which is normal to the substrate) is produced.

A TE-TM mode splitter 26 is formed at an area 81. The TE-TM mode splitter 26 is designed such that it transmits most parts (for example, 80%) of the TE mode component from the point B to the point C for the forward light (the light beam mentioned above), and directs most parts (for example, 80%) of the TE mode component from the point C to the point B and the rest (for example, 20%) from the point C to a point D in the third wave guide, and 100% of the TM mode component from the point C to the point D for the return light (the signal light beam deflected by the disk).

Thus, all portions of the TM component and some portions of the TE component of the signal light beam returned to the point C are directed to the point D. Namely, the TM mode component which is the AC signal component necessary for reading the information is directed to the area 83 of the wave guide 23 without loss.

A wave guide polarization rotator including a phase shifter 31 having electrodes and a mode converter 32 having periodical structure electrodes is provided at the area 83. A phase difference between the TE mode and the TM mode is rendered 90 degrees by the phase shifter 31, and the direction of polarization of the guided light is rotated by a predetermined angle by the mode converter 32. The angle of rotation is controlled by a pitch of the electrodes and a voltage applied. When a symmetric differential method is used, the angle of rotation is preferably set to 45 degrees, and when an asymmetric differential method is used, it is preferably other than 45 degrees.

For simplicity of explanation, means for reading the recorded information for the symmetric differential method is explained.

When the information is recorded on the disk, the signal light beam arriving at the point E has a 44 degrees polarization vector ("0" state light which is rotated in a negative direction by the disk reflection) or a 46 degrees polarization vector ("1" state polarization which is rotated in a positive direction by the disk reflection) due to two information store states "1" and "0" on the magnetic medium caused by the magnetic orientation of the magneto-optical material. For the simplicity of explanation, it is assumed that the rotation angle of the polarization vector by the disk reflection is one degree.

The signal light beam having the above components is directed to the second branch point E, and the TE mode component is directed to the point F (wave guide 24) while the TM mode component is directed to the point G (wave guide 25) by the TE-TM mode splitter 27 formed in the area 85.

Photo-detectors 15a and 15b of the same construction connected to end planes of the wave guides 24 and 25 are coupled to the end plane of the substrate 10, and the light intensities of the respective components of the signal light beam directed to the wave guides 24 and 25 are detected by the photo-detectors 15a and 15b connected to the end planes of the respective wave guides.

The relative amplitudes of the signals detected by the photo-detectors 15a and 15b are compared by the differential method so that the content of the magneto-optically recorded information on the disk is detected.

In accordance with the optical integrated device of the first embodiment, the loss of light intensity in the wave guides is minimized and the component necessary for the detection can be directed to the detection system without substantial loss. Accordingly, the detection efficiency is significantly improved.

In the present embodiment, the light beam from the laser source is the TE polarization component and the component by the Kerr rotation is the TM component although the laser beam may be the TM polarization and the component by the Kerr rotation may be the TE component.

A second embodiment of the present invention is now explained. In the second embodiment shown in FIG. 2, a device for writing (recording) magnetic record information is integrated as it is in the prior art.

Figure 2:
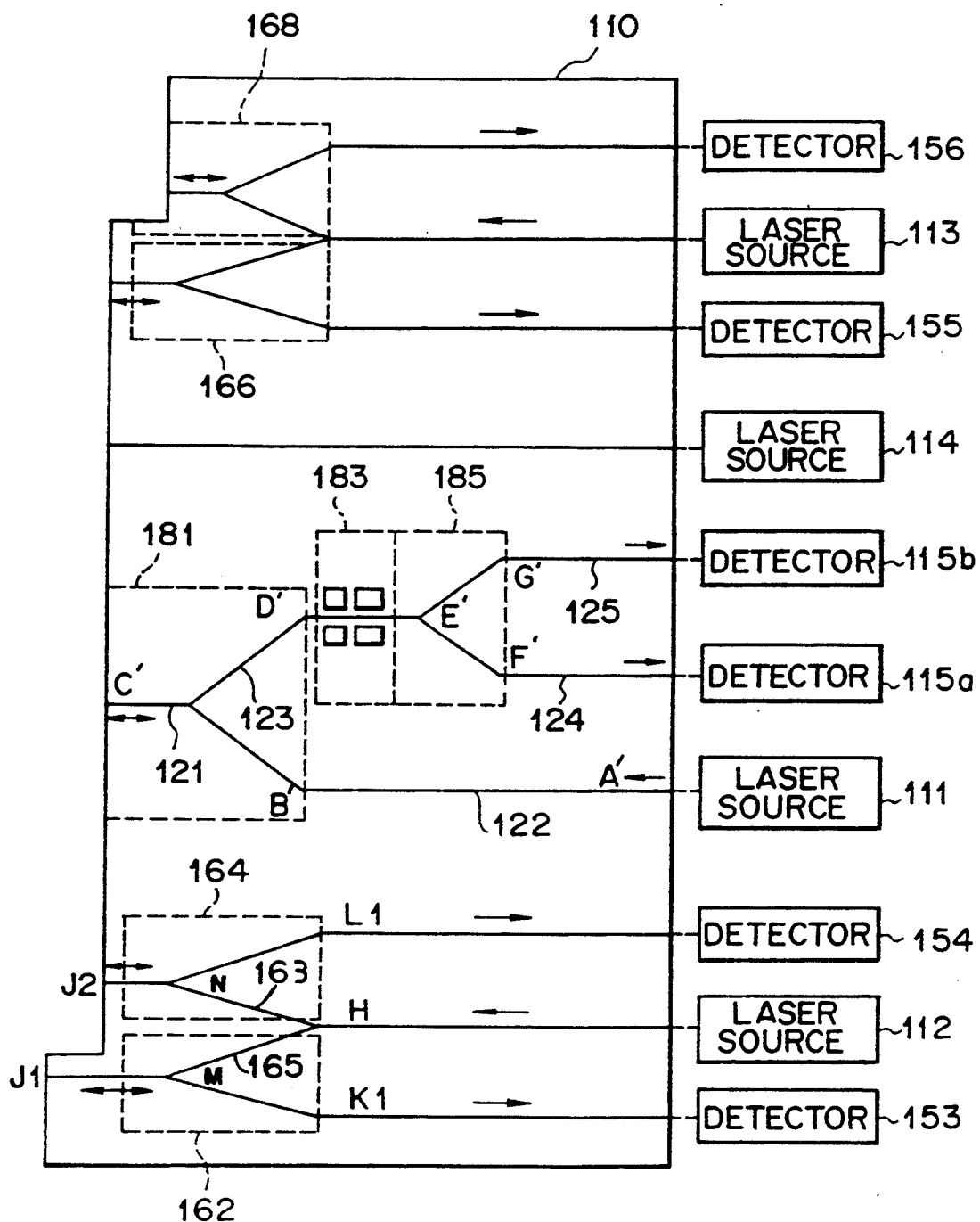
FIG. 2 shows a schematic view of a second embodiment of the present invention.

In FIG. 2, wave guides 121-125 formed on a substrate 110 and optical means formed in areas 181, 183, and 185 in the wave guides attain the same function as that of the previous embodiment.

A light beam to be used for reading the information recorded on the disk is supplied from a laser source 111 formed externally of the substrate, and the recorded information is read and detected by photo-detectors 115a and 115b.

On the other hand, a laser source 114 is used to write record information on the disk.

In the second embodiment, an illumination system and detection system for a reflected light for tracking a groove of the magneto-optical recording medium on the rotating disk and focusing the light beam are provided. They comprise two identical sets of laser, wave guide and detection systems 112, 162, 164, 153, 154 and 113, 166, 168, 155 and 156. Since the two detection systems are identical in construction and function, one of them is explained.

A light beam is emitted from the laser source 112 arranged externally of the substrate and it is directed to a splitter arranged at a point H. The light beam is split into separate wave guides 163 and 165. The split light is emitted from end planes J1 and J2 arranged at an edge of the substrate 110 and is directed to the rotating disk plane. The light reflected thereby again enters the end planes J1 and J2 and is directed to K1 and L1 by splitters at M and N. The amplitudes of those light beams are measured by the photo-detectors 153 and 154. The photo detector 153 is used for focusing detection and the photo-detector 154 is used for tracking detection. The light beams are emitted from the points J1 and J2 with the same spot size at those points. A focusing error signal is detected by an offset of the distance from J1 to J2 and correction is made by an appropriate correction mechanism. For example, in a read (reproducing) system which uses three spot lights as shown in U.S. Pat. No. 3,876,842, it is not necessary that all of the emitting ends of the wave guides align on the same plane. Namely, two transmitting ends of the wave guides which transmit the tracking detection light from the laser sources 112 and 113 are preferably offset by a predetermined amount from another transmitting end in a direction normal to the plane of the drawing.

In the present embodiment, one or more substrates (not shown) are provided on the right hand of the substrate 110 to support elements 111-114 and 153-156. The substrates have means for optically connecting the respective elements to the corresponding wave guides of the substrate 110.

The device of the second embodiment is used to track the groove and focus the light to the disk surface or a predetermined area so that the information at the correct area of the disk is read and written. The two identical circuits are used to track one groove area and used for focusing on one side of the reading track or the writing track of the information in the vicinity of the read/write spot.

While not shown, the device which carries the optical integrated element is moved in accordance with a tracking error signal detected by the tracking detector and the device is moved to focus the light beam onto the magneto-optical medium.

what is claimed is:

1. An optical integrated device for a magneto-optical reproducing head, comprising:
   a substrate;
   a first wave guide for guiding a light beam for irradiating a magneto-optical recording medium and a signal light beam reflected by the medium;
   a first TE-TM mode splitter for splitting said first wave guide into two wave guides;
   a second wave guide coupled to said first wave guide through said first splitter for guiding the light beam for irradiating the magneto-optical recording medium to said first wave guide;
   a third wave guide coupled to said first wave guide through said first splitter for guiding said signal light beam from said first wave guide;
   polarization plane rotation means arranged in a course of said third wave guide for rotating a polarization plane of said signal light beam;
   a second TE-Tm mode splitter for splitting said third wave guide into two wave guides;
   a fourth wave guide and a fifth wave guide coupled to said third wave guide through said second splitter for guiding detection light beams split by said second splitter;
   said five wave guides and said two mode splitters being formed on said substrate;
   wherein said first TE-Tm mode splitter guides all of a TM mode component and some of a TE mode component of the signal light beam reflected from the recording medium into said third wave guide.

2. A device according to claim 1, wherein said second TE-TM mode splitter guides a TE mode component of the signal light beam guided in said third wave guide into said fourth wave guide and a TM mode component of the signal light beam guided in said third wave guide into said fifth wave guide.

3. A device according to claim 1, wherein said polarization plane rotation means comprises a phase shifter having electrodes and a mode converter having periodical structure electrodes.

4. A device according to claim 1 further comprising:
a sixth wave guide for guiding a light beam from a laser source;
a third splitter for splitting said sixth wave guide into two wave guides;
a seventh wave guide coupled to said sixth wave guide through said third splitter for guiding a light beam from said sixth wave guide to irradiate said recording medium and for guiding a light beam reflected form said recording medium;
an eighth wave guide coupled to said sixth wave guide through said third splitter for guiding a light beam from said sixth wave guide to irradiate said recording medium and for guiding a light beam reflected from said recording medium;
a ninth wave guide coupled to said seventh wave guide for guiding a light beam reflected from the recording medium; and
a tenth wave guide coupled to said eighth wave guide for guiding a light beam reflected from the recording medium;
said sixth, seventh, eighth, ninth and tenth wave guides and said third splitter being formed on said substrate.

5. An optical integrated device for a magneto-optical reproducing head, comprising:
a substrate;
a first wave guide for guiding a light beam for irradiating a magneto-optical recording medium and a signal light beam reflected by the medium;
a first TE-TM mode splitter for splitting said first wave guide into two wave guides;
a second wave guide coupled to said first wave guide through said first splitter for guiding the light beam for irradiating the magneto-optical recording medium to said first wave guide;
a third wave guide coupled to said first wave guide through said first splitter for guiding said signal light beam from said first wave guide;
polarization plane rotation means arranged in a course of said third wave guide for rotating a polarization plane of said signal light beam;
a second TE-TM mode splitter for splitting said third wave guide into two wave guides;
a fourth wave guide and a fifth wave guide coupled to said third wave guide through said second splitter for guiding detection light beams split by said second splitter;
said five wave guides and said two mode splitters being formed on said substrate;
wherein said first TE-TM mode splitter guides all of a TE mode component and some of a TM mode component of the signal light beam reflected from the recording medium into said third wave guide.

6. A device according to claim 5, wherein said second TE-TM mode splitter guides a TM mode component of the signal light beam guided in said third wave guide into said fourth wave guide and a TE mode component of the signal light beam guided in said third wave guide into said fifth wave guide.

7. A device according to claim 5, wherein said polarization plane rotation means comprises a phase shifter having electrodes and a mode converter having periodical structure electrodes.

8. A device according to claim 5 further comprising:
a sixth wave guide for guiding a light beam from a laser source;
a third splitter for splitting said sixth wave guide into two wave guides;
a seventh wave guide coupled to said sixth wave guide through said third splitter for guiding a light beam from said sixth wave guide to irradiate said recording medium and for guiding a light beam reflected from said recording medium;
an eighth wave guide coupled to said sixth wave guide through said third splitter for guiding a light beam from said sixth wave guide to irradiate said recording medium and for guiding a light beam reflected from said recording medium;
a ninth wave guide coupled to said seventh wave guide for guiding a light beam reflected from the recording medium; and
a tenth wave guide coupled to said eighth wave guide for guiding a light beam reflected from the recording medium;
said sixth, seventh, eighth, ninth and tenth wave guides and said third splitter being formed on said substrate.

* * * * *